(12) United States Patent
Matsuhara et al.

(10) Patent No.: US 8,839,104 B2
(45) Date of Patent: Sep. 16, 2014

(54) ADJUSTING AN IMAGE USING A PRINT PREVIEW OF THE IMAGE ON AN IMAGE FORMING APPARATUS

(71) Applicants: Kenji Matsuhara, Kawanishi (JP); Kazuaki Tomono, Itami (JP); Kenichi Takahashi, Sennan-gun (JP); Jun Kunioka, Okazaki (JP)

(72) Inventors: Kenji Matsuhara, Kawanishi (JP); Kazuaki Tomono, Itami (JP); Kenichi Takahashi, Sennan-gun (JP); Jun Kunioka, Okazaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/737,556

(22) Filed: Jan. 9, 2013

(65) Prior Publication Data
US 2013/0182285 A1  Jul. 18, 2013

(30) Foreign Application Priority Data

Jan. 12, 2012 (JP) ................................. 2012-004467

(51) Int. Cl.
*H04N 1/00* (2006.01)
*G06T 11/60* (2006.01)
*H04N 1/387* (2006.01)

(52) U.S. Cl.
CPC ............ *H04N 1/00458* (2013.01); *G06T 11/60* (2013.01); *H04N 1/387* (2013.01); *H04N 2201/0094* (2013.01)
USPC ......................................... 715/274; 358/1.15

(58) Field of Classification Search
CPC . G06F 3/1256; H04N 1/0044; H04N 1/00466
USPC .................................. 358/1.15, 1.18; 715/274
See application file for complete search history.

(56) References Cited

U.S. PATENT DOCUMENTS

2011/0029859 A1  2/2011  Igari

FOREIGN PATENT DOCUMENTS

| JP | 63-059654 A | 3/1988 |
|---|---|---|
| JP | 2004-213305 A | 7/2004 |
| JP | 2006-065588 A | 3/2006 |
| JP | 2006-166207 A | 6/2006 |
| JP | 2010-286904 A | 12/2010 |

OTHER PUBLICATIONS

MS Word.*
Official Action issued by Japanese Patent Office on Feb. 25, 2014 in Japanese Application No. 2012-00467, and English language translation of Official Action (4 pgs).

* cited by examiner

*Primary Examiner* — Eric A Rust
(74) *Attorney, Agent, or Firm* — Buchanan Ingersoll & Rooney PC

(57) ABSTRACT

An image forming apparatus with a display displaying a preview image of a document with a plurality of pages having text sections in a text data format and illustration sections in an image data format; an illustration section selector which selects one of the illustration sections on any of the pages in the preview image displayed on the display, according to a user operation; a page selector which specifies one of the pages as a destination page to which the selected illustration section is to be transferred, according to a user operation; a realignment portion which transfers the selected illustration section to the destination page selected by the page selector and realigns texts in a text section of the destination page; and a controller which allows the display to display a preview image of the destination page including the texts realigned by the realignment portion.

12 Claims, 11 Drawing Sheets

ADJUSTING AN IMAGE USING A PRINT PREVIEW OF THE IMAGE ON AN IMAGE FORMING APPARATUS

This application claims priority under 35 U.S.C. §119 to Japanese Patent Application No. 2012-004467 filed on Jan. 12, 2012, the entire disclosure of which is incorporated herein by reference in its entirety.

BACKGROUND OF THE INVENTION

1. Field of the Invention

The present invention relates to: an image forming apparatus such as a multifunctional digital machine which is also referred to as Multifunction Peripheral (MFP); and a document preview method for the image forming apparatus.

2. Description of the Related Art

The following description sets forth the inventor's knowledge of related art and problems therein and should not be construed as an admission of knowledge in the prior art.

There has been a common MFP which is capable of, for example: displaying on a display a preview image of image data read out from a document by image scanning; examining whether the orientation and order of pages are correct; and allowing users to rotate the orientation and recover the proper order of pages if necessary.

Also there has been a common MFP which is capable of: detecting text sections and illustration sections such as charts, tables, photos, and the like and separating from an image format document obtained by document scanning; converting the text sections to a text data format by the optical character recognition function; consolidating the text sections in a text data format and the illustration sections in an image data format all together into an electronic document consisting of a plurality of pages; and displaying a preview image of the pages on a display, one by one or plural by plural.

Such a document may include an illustration section such as a photo on one of the pages and an explanatory text section thereof which continues to another page that follows. A MFP can display a preview image of each page of the document on a display screen in the order of page numbers. While reading texts in the explanatory text section, users may want go back to review a drawing or photo in the illustration section on a previous page.

In this case, users used to change the preview image to a previous page to review the illustration section thereon then return the preview image back to the original page, all manually.

Japanese Unexamined Patent Publication No. 2010-286904 discloses an image processing apparatus which is capable of displaying picture or graphical objects in a page layout other than the order of page numbers; and editing the page layout by detecting coordinate values of all page breaks in the objects, separating the objects by the detected coordinate values, and allocating them on their relative pages.

Japanese Unexamined Patent Publication No. S63-059654 discloses an image processing apparatus which achieves efficiency in editing a document, i.e., allows users to select any of the fixed blocks controlled independently from the document itself to transfer an image to a predetermined page even while editing the document, only by giving an instruction to create or delete a page break.

However, it is very troublesome to change the preview image from an original page to a previous page to review an illustration section thereon then return the preview image back to the original page, all manually, which is a problem still remaining unsolved by these publications.

The techniques described in Japanese Unexamined Patent Publications No. 2010-286904 and S63-059654 are capable of editing the page layout or moving an image to another position, but cannot solve the inconvenience which occurs when changing the preview image from an original page to another page to review a drawing or photo in an illustration section thereon, as described above.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The present invention has been made in order to solve the problem described above; it is an object of the present invention to provide: an image forming apparatus which does not require users to: change the preview image from an original page to another page in order to review a drawing or photo in an illustration section on the other page; and return the preview image back to the original page after the review, all manually; and a document preview method for the image forming apparatus.

A first aspect of the present invention relates to an image forming apparatus comprising:

a display which is capable of displaying a preview image of a document, the document consisting of a plurality of pages including one or more text sections in a text data format and one or more illustration sections in an image data format;

an illustration section selector which selects one of the one or more illustration sections on any of the pages in the preview image displayed on the display, according to a user operation;

a page selector which specifies one of the plurality of pages as a destination page to which the illustration section selected by the illustration section selector is to be transferred, according to a user operation;

a realignment portion which transfers the illustration section selected by the illustration section selector to the destination page selected by the page selector and realigns texts in a text section of the destination page; and a controller which allows the display to display a preview image of the destination page including the texts realigned by the realignment portion.

A second aspect of the present invention relates to an image forming apparatus comprising:

a display which is capable of displaying a preview image of a document, the document consisting of a plurality of pages including one or more text sections in a text data format and one or more illustration sections in an image data format;

an illustration section selector which selects one of the one or more illustration sections on any of the pages in the preview image displayed on the display, according to a user operation;

a page changer which changes the preview image on the display from page to page; and a controller which allows the display to display the illustration section selected by the illustration section selector, in a display area other than where the preview image is displayed, not depending on which page comes up to preview because of the page changer.

A third aspect of the present invention relates to a document preview method for an image forming apparatus, the image forming apparatus comprising a display which is capable of displaying a preview image of a document, the document consisting of a plurality of pages including one or more text sections in a text data format and one or more illustration sections in an image data format, the document preview method comprising:

selecting one of the one or more illustration sections on any of the pages in the preview image displayed on the display, according to a user operation;

selecting one of the plurality of pages as a destination page to which the selected illustrations section is to be transferred, according to a user operation;

transferring the selected illustration section to the selected destination page and realigning texts in a text section of the destination page; and allowing the display to display a preview image of the destination page including the realigned texts.

A fourth aspect of the present invention relates to a document preview method for an image forming apparatus, the image forming apparatus comprising a display which is capable of displaying a preview image of a document, the document consisting of a plurality of pages including one or more text sections in a text data format and one or more illustration sections in an image data format, the document preview method comprising:

selecting one of the one or more illustration sections on any of the plurality of pages in the preview image displayed on the display, according to a user operation;

changing the preview image on the display from page to page; and allowing the display to display the selected illustration section in a display area other than where the preview image is displayed, not depending on which page comes up to preview.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, an embodiment of the present invention will be described with reference to the accompanying drawings.

Figure 1:
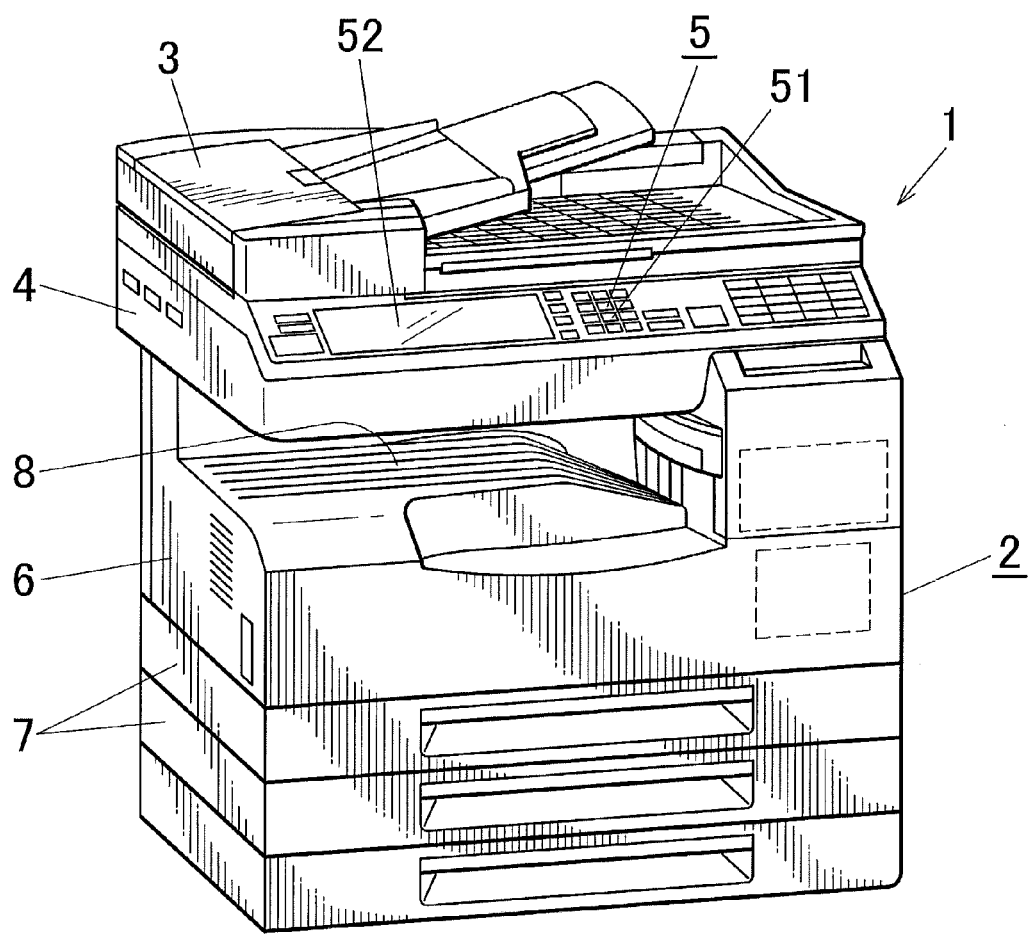
FIG. 1 is an exterior perspective view of an image forming apparatus according to one embodiment of the present invention.

FIG. 1 is an exterior perspective view of an image forming apparatus 1 according to one embodiment of the present invention. In this embodiment, a MFP is employed as the image forming apparatus 1. Hereinafter, the image forming apparatus 1 will be also referred to as MFP 1.

The MFP 1 includes: an automatic document feeder 3 disposed on the top of a body 2; a scanner unit 4; an operation panel 5; an image former 6; a sheet feeder 7; and the like.

The automatic document feeder 3 is configured to automatically convey sheets of a document placed in position to a predetermined reading position one by one.

The scanner 4 is provided with an image reader 41 (illustrated in FIG. 3) such as an image sensor, which is configured to read the document conveyed to the predetermined reading position by the automatic document feeder 3. The scanner 4 is configured to convert the document read by the image reader 41, to an image data format that is an electronic data format.

The operation panel 5 is used by users to operate the MFP 1. The operation panel 5 is provided with: a keyboard 51 collectively having a numerical keypad, a Start key, a Stop key, and other keys; and a display 52 such as a liquid-crystal touch-panel display, which is configured to display messages, the status of the MFP 1, and other information.

The image former 6 prints image data read out from a document by the scanner unit 4 and print data received from external machines such as user terminals via a network, according to a mode specified by users.

The sheet feeder 7 holds sheets of copy paper and feeds sheets into the image former 6 as they are needed.

Sheets of paper with images being printed thereon by the image former 6 are eventually guided to a paper output tray 8.

Figure 2:
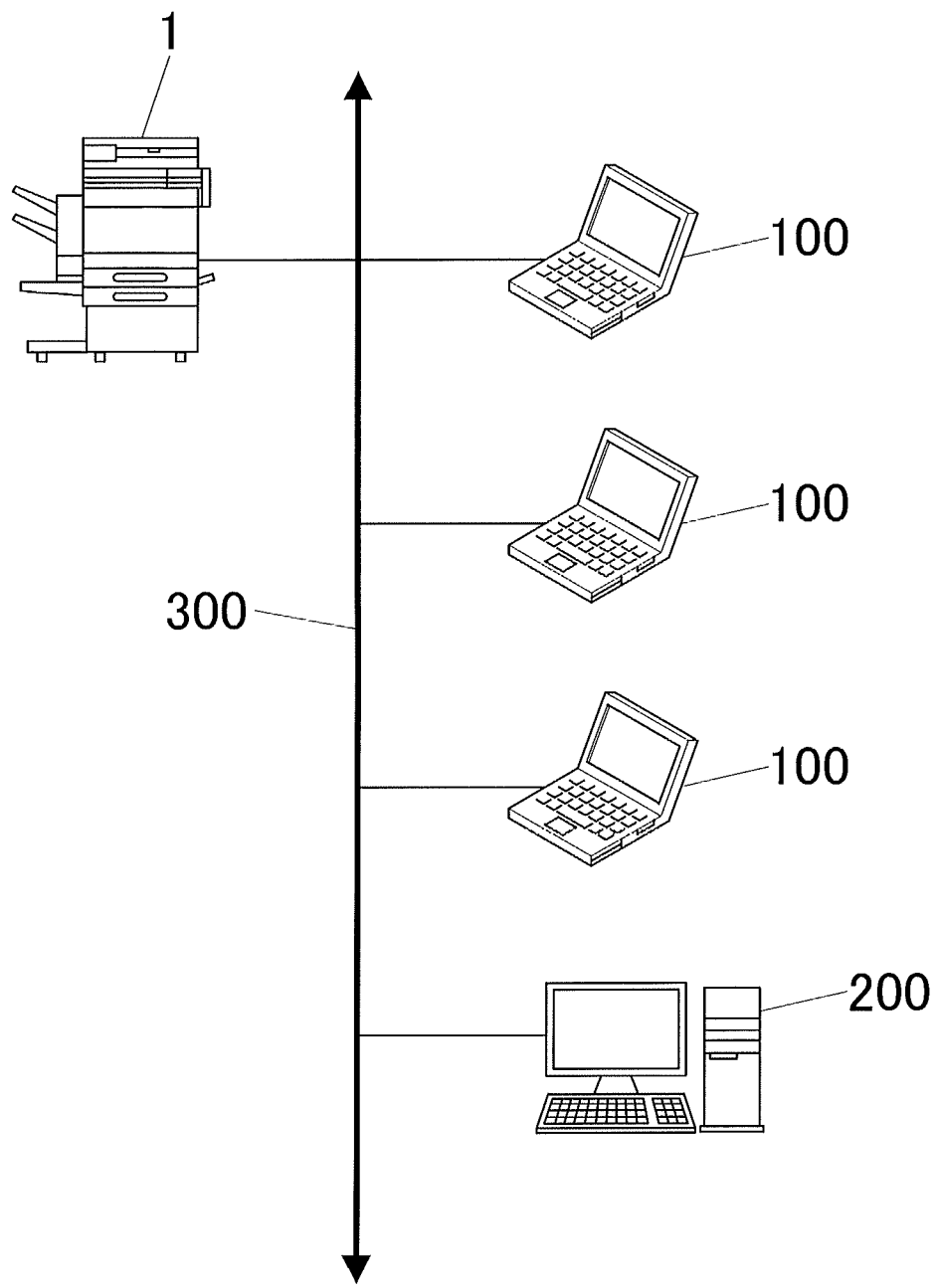
FIG. 2 is a view illustrating a configuration of a network system including the image forming apparatus of FIG. 1.

FIG. 2 is a view illustrating a configuration of a network system including the MFP of FIG. 1. This network system includes: a MFP 1; one or more user terminals 100 constituted by personal computers, a server 200; and the like, all of which are connected to each other via a network 300.

Figure 3:
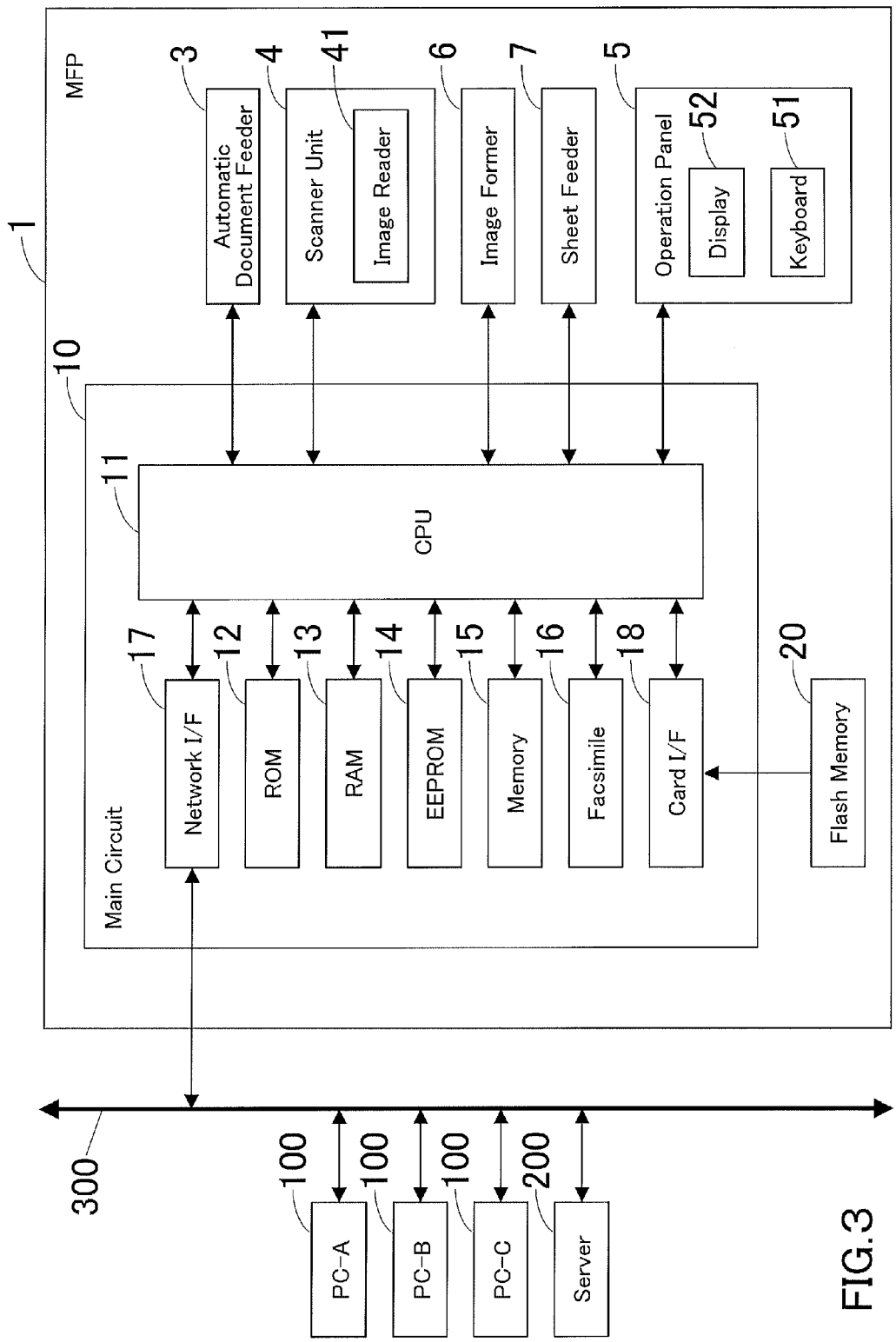
FIG. 3 is a block diagram illustrating an electronic configuration of the image forming apparatus.

FIG. 3 is a block diagram illustrating an electrical configuration of the MFP 1.

As illustrated in FIG. 3, the MFP 1 includes: a main circuit 10 serving as a controller, in addition to: the automatic document feeder 3; the scanner unit 4 provided with the image reader 41; the operation panel 5 provided with the keyboard 51 and the display 52; the image former 6; and the sheet feeder 7 as described above.

The main circuit 10 is provided with a CPU 11, a ROM 12, a RAM 13, an EEPROM 14, a facsimile 16, a network interface (network I/F) 17, and a card interface (card I/F) 18.

The CPU 11 controls the entire MFP 1 in a unified and systematic manner to execute various functions of the MFP 1 such as the copier function, printer function, scanner function, and facsimile function. Specifically, in this embodiment, the CPU 11 detects and separates text sections and illustration sections from image data read out from a document consisting of a plurality of pages, converts the text sections to text data by performing optical character recognition (also referred to as OCR) on the text sections, consolidates the text sections in a text data format and the illustration sections in an image data format all together into an electronic document, and displays a preview image of the electronic document on the display. These operations will be later described in details.

The ROM 12 is a memory storing operation programs for the CPU 11 to execute processing and other data; and the RAM 13 is a memory providing a work area for the CPU 11 to execute operation programs stored on the ROM 12.

THE EEPROM 14 is a non-volatile memory storing information for billing such as the number of copies which are made by each user and the total number of sheets of paper having been used, in a rewritable manner.

The memory 15, which is constituted by a hard disk drive (HDD) for example, stores various applications and other data. The memory 15 has one or more memory areas which are called "boxes", each of which is capable of storing image data, print data, and the like. The one or more boxes may include: private boxes allocated for all users; group boxes allocated for all groups, i.e., all departments of office; and shared boxes allowing any users to access, for example.

The facsimile 16 controls transmission and receipt of facsimile.

The network I/F 17 serves as a communicator transmitting or receiving data to and from external machines such as the user terminals 100 and the server 200, via the network 300.

The card I/D 18 serves as an interface to which an external memory such as a flash memory 20 is connected.

Figure 4:
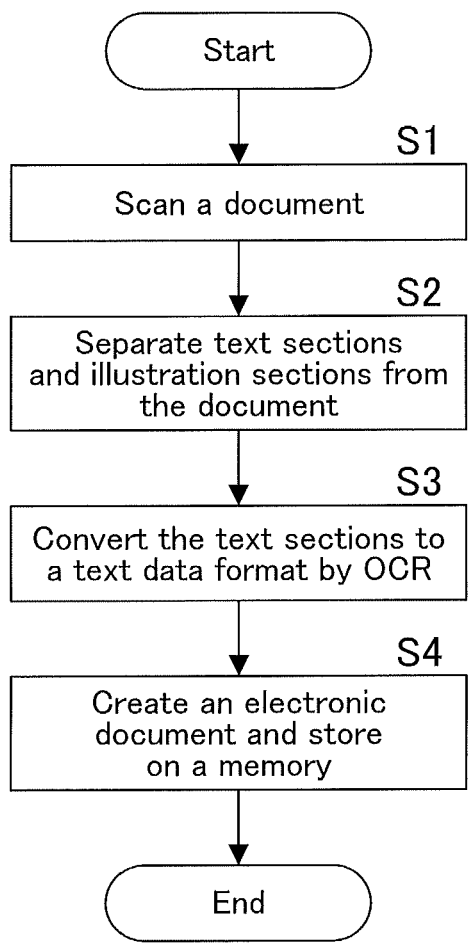
FIG. 4 is a flowchart representing a document creating and storing operation executed by the image forming apparatus.

FIG. 4 is a flowchart representing an electronic document creating and storing operation executed by the MFP 1. This processing routine is executed by the CPU 11 of the MFP 1 according to an operation program stored on a recording medium such as the ROM 12 of the MFP 1.

In Step S1, a document consisting of a plurality of pages is scanned by the scanner unit 4 in a page-by-page manner, and thereby image data of the plurality of pages of the document is obtained.

In Step S2, text sections and illustration sections such as photos, drawings, and the like are detected and separated from the document in a page-by-page manner. As in a similar manner to compact PDF compression, image layers are generated to hold thereon the objects separated from the document, i.e., the text sections and the illustration sections.

In Step S3, OCR is performed on the text sections to convert them into text data.

Subsequently, in Step S4, the text sections in a text data format and the illustration sections in an image data format are consolidated all together into an electronic document consisting of a plurality of pages, with all these sections' original positions being kept therein; the electronic document is then stored on a memory such as the memory 15.

Figure 5:
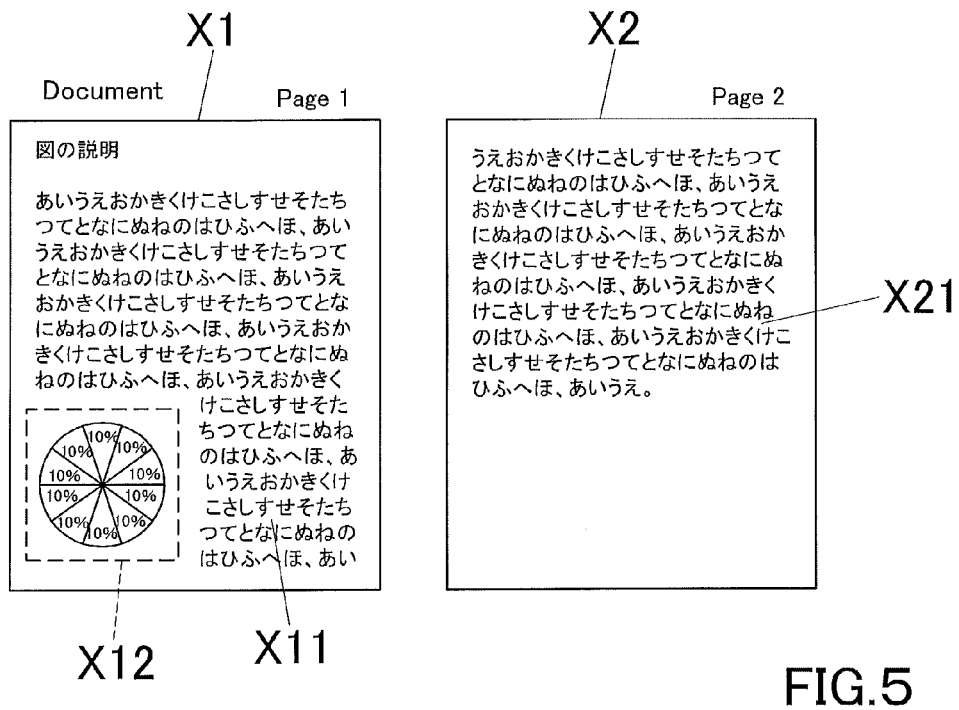
FIG. 5 illustrates two pages constituting a document.

FIG. 5 is a view to explain how to display a preview image of the electronic document created and stored on the memory 15 in the way above, on the display 52 of the operation panel 5.

FIG. 5 illustrates the following two pages constituting an electronic document: document data X1 and X2. Having duplicated from that of the original document, the document data X1 and X2 is referred to as "document" in this figure for the sake of simplicity. Unlike that of the original document, text sections in a text data format and illustration sections in an image data format can be separated from the document data, and texts in the text sections can be realigned.

As illustrated in FIG. 5, the document data X1 is composed of a text section X11 and an illustration section X12 while the document data X2 is composed of a text section X21 only.

Figure 6:
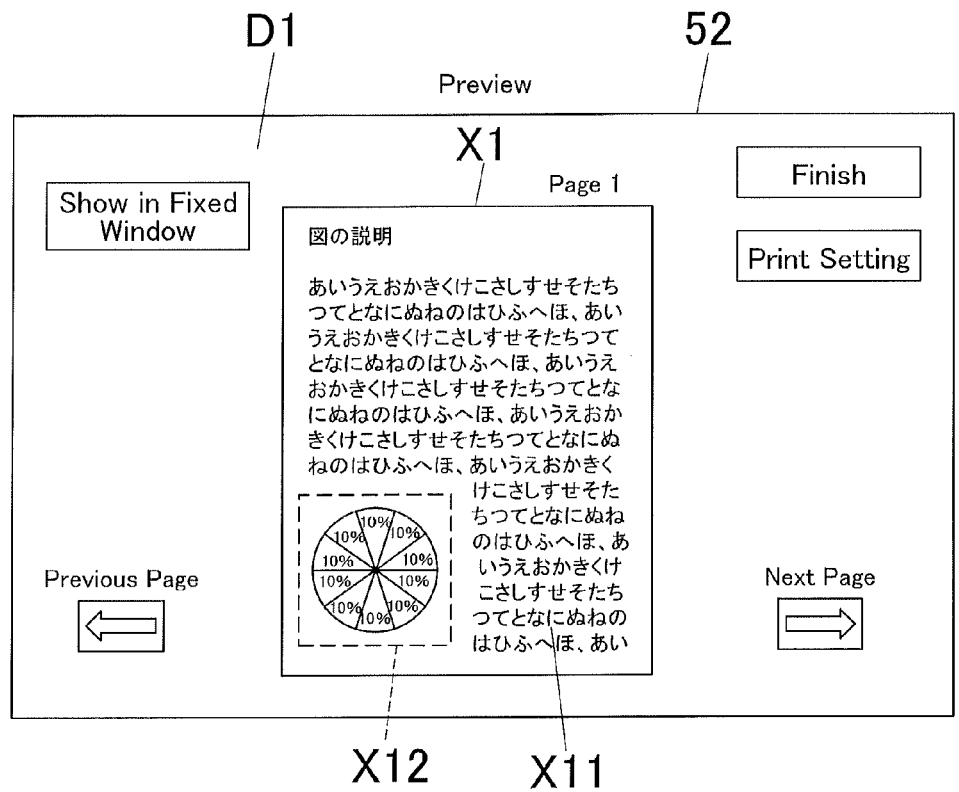
FIG. 6 illustrates a preview image of a first page of the electronic document, displayed on a display screen on a display of an operation panel according to a user operation.

FIG. 6 illustrates a preview image of the document data X1, a first page of the document, appearing on a display screen D1 on the display 52 of the operation panel 5 according to a user operation. On the display screen D1, a "Finish" key, a "Print Setting" key, a "Show in Fixed Window" key, a "Next Page" key, and a "Previous Page" key appear in addition to the document data X1.

The "Finish" key serves to terminate preview display; the "Print Setting" key serves to allow configuring a print setting on the document data X1 currently in preview. The "Show in Fixed Window" key serves to display in a fixed window the illustration section X12 on the document data X1 currently in preview, which will be later described in details. The "Next Page" key serves to change the preview image to the next page of the document while the "Previous Page" key serves to change the preview image to the previous page of the document.

Figure 7:
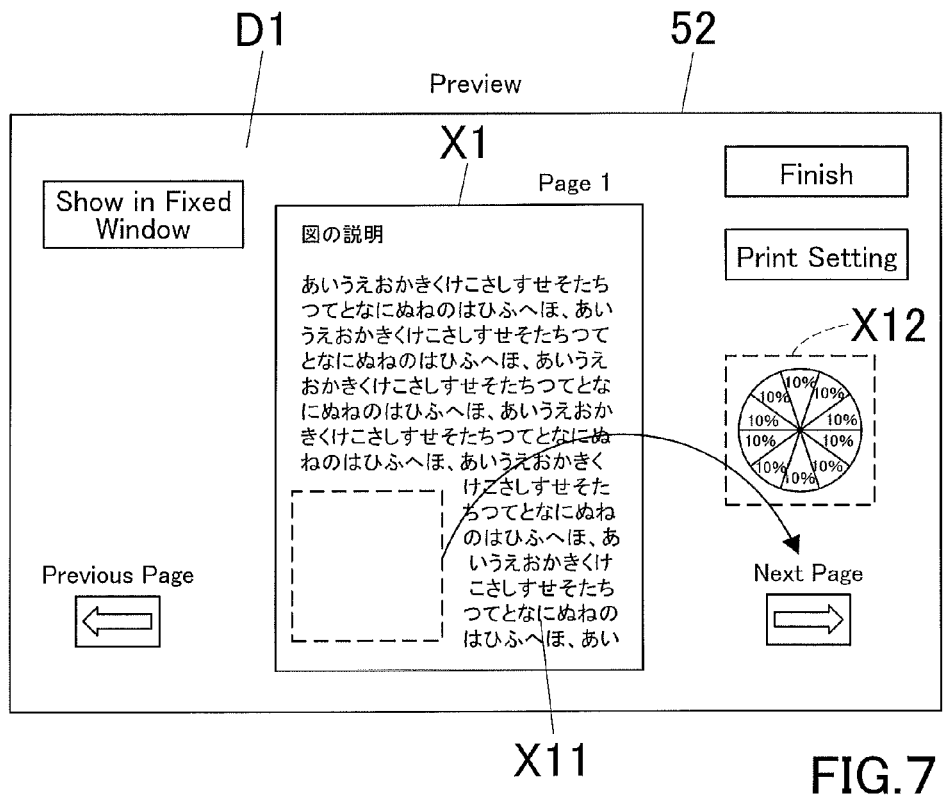
FIG. 7 illustrates the preview image of the first page of the electronic document as illustrated in FIG. 6, displayed on a display screen along with an indication to touch an illustration section on the first page of the electronic document and drag it to the "Next Page" key.
Figure 8:
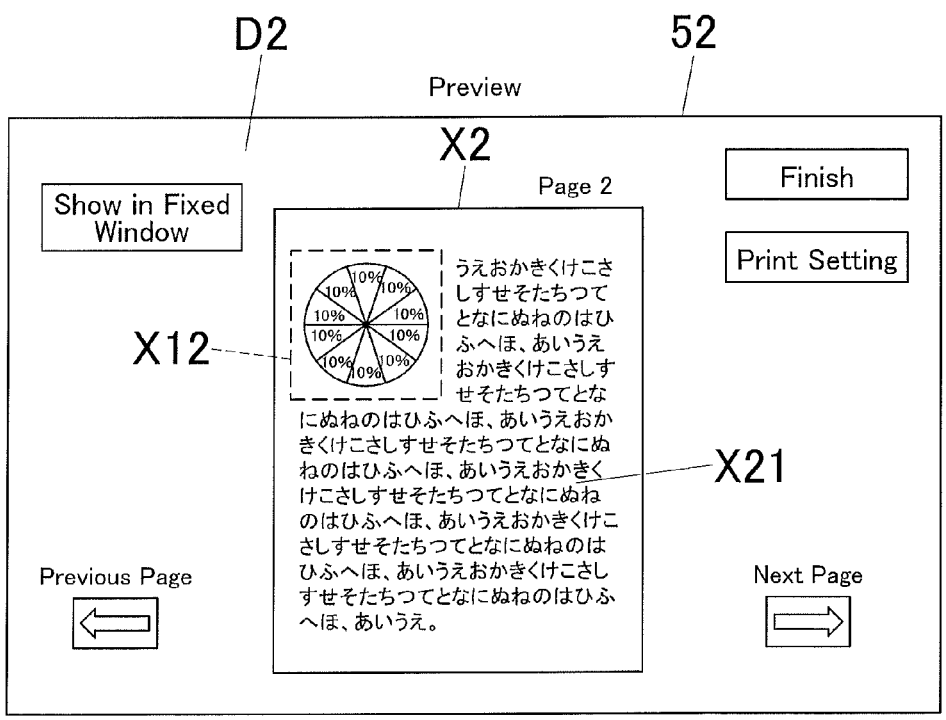
FIG. 8 illustrates a preview image of a second page of the electronic document, displayed on a display screen along with the illustration section having been moved in from the first page.

When a user touches the illustration section X12 of the document data X1, a first page of the document, via the display screen D1 of FIG. 6, and drags it to the "Next Page" key as indicated by a solid arrow of FIG. 7, a preview image of the document data X2, a second page of the document, comes up to another display screen D2 on the display 52 along with the illustration section X12 having moved in from the first page of the document, as illustrated in FIG. 8. In other words, the illustration section X12 selected by a user's touching via the display screen D1, on which a preview image of the document data X1, the first page of the document, is displayed, is transferred to a particular position such as top of the document data X2, the second page of the document, which is designated by a user's dragging to the "Next Page" key, as a destination page.

In this case, texts in the text section X21 are realigned by the control of the CPU 11 so that they will not overlap with the illustration section X12 having moved in to the second page of the document. In the example of FIG. 8, the number of characters per line on a side of the illustration section X12 has been reduced, and a line break allows extra characters over each line to continue to the next line. Giving line breaks like this may cause the entire texts in the text sections X21 unable to be contained in the second page of the document. In this case, an extra portion of them may be transferred to the next page.

The particular position to which the illustration section X12 is transferred from the first page of the document should not necessarily be limited to top of the second page of the document. The user's operation to select the illustration section X12 to transfer should not necessarily be limited to touching the illustration section X12; the user's operation to designate the document data X2 as a destination page should not necessarily be limited to dragging the touched object to the "Next Page" key. These operations depend on the settings. For example, the illustration section X12 may be transferred to the destination page by simply touching the "Next Page" key, instead of touching the illustration section X12 and dragging it to the "Next Page" key. By any of the operations introduced above, users are allowed to transfer the illustration section X12 to the destination page easily. A page of the document may be designated as a destination page by entering its page number via the numerical keypad or the like.

An illustration section to transfer may be selected by touching it among a plurality of illustration sections in one page of the document.

Figure 9:
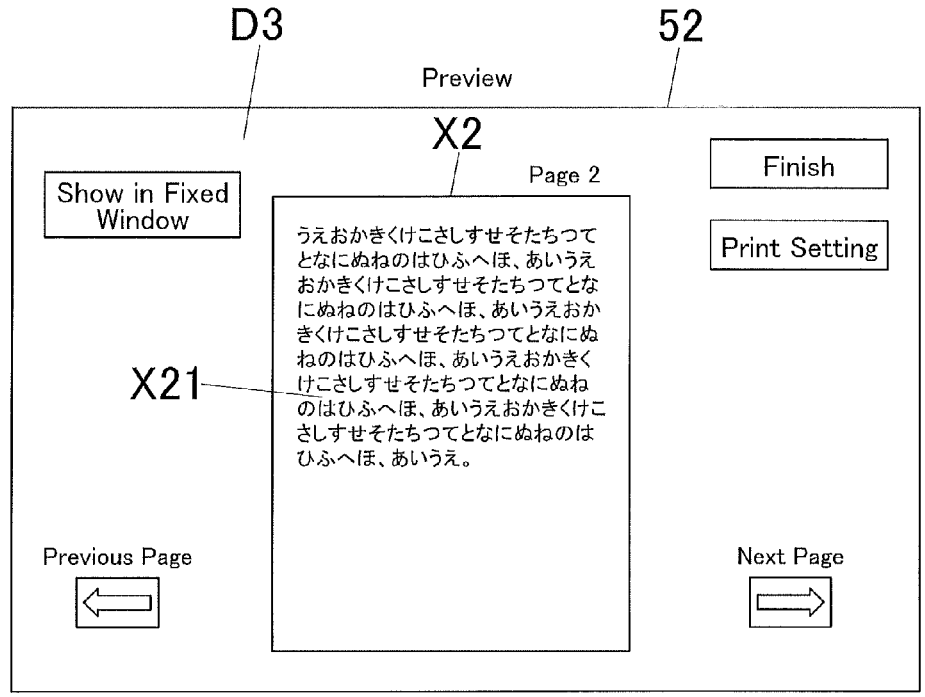
FIG. 9 illustrates a preview image coming up next to the preview image of FIG. 8 when the "Finish" key is pressed.

When the "Finish" key is pressed via the display screen D2 (FIG. 8), on which a preview image of the document data X2, the second page of the document, is displayed along with the illustration section X12, the illustration section X12 is returned to the original position of the document data X1, the first page of the document. At the same time, the document data X2, the second page of the document, is restored to its original layout before the realignment of the texts, i.e., before having the illustration section X12 thereon. FIG. 9 illustrates a preview image of the original document data X2, the original second page of the document, coming up to a display screen D3 at that time. When the "Finish" key is pressed via the display screen D3, preview function is terminated.

As described above, in this embodiment, according to a user operation, the illustration section X12 is transferred to a destination page, and texts on the destination page are realigned because of the illustration section X12 having moved in, and then a preview image of the document data X2, the destination page, comes up in a layout adjusted thereby. This would make it unnecessary any more to change the preview image from an original page to another page to review a drawing or photo in an illustration section thereon then return the preview image back to the original page, all manually, which has been troublesome.

Figure 10:
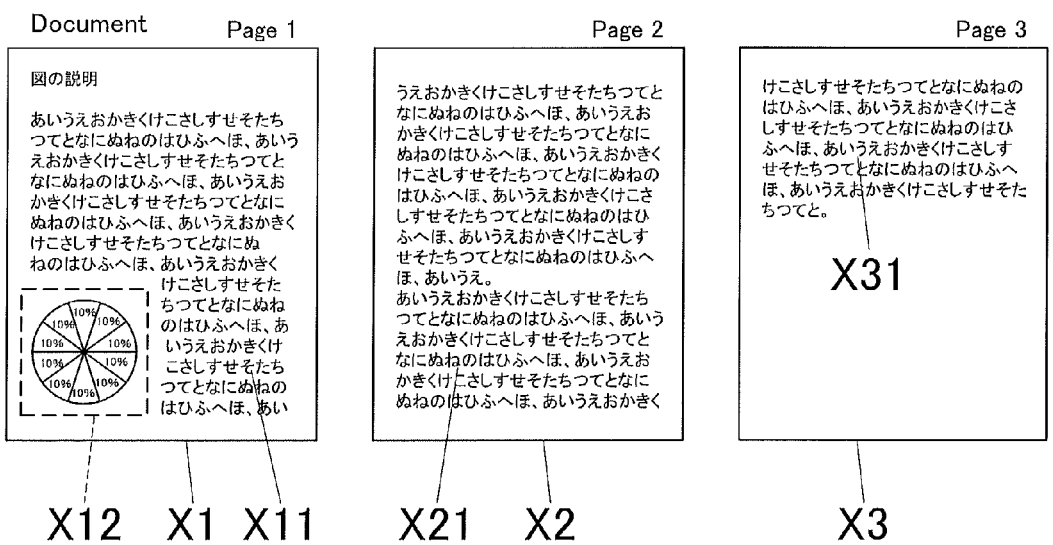
FIG. 10 illustrates three pages constituting an electronic document.

FIG. 10 illustrates three pages constituting an electronic document (also referred to simply as "document").

As illustrated in FIG. 10, document data X1 is composed of a text section X11 in a text data format and an illustration section X12 in an image data format; document data X2 is composed of a text section X21 in a text data format; and document data X3 is composed of a text section X31 in a text data format.

Figure 11A:
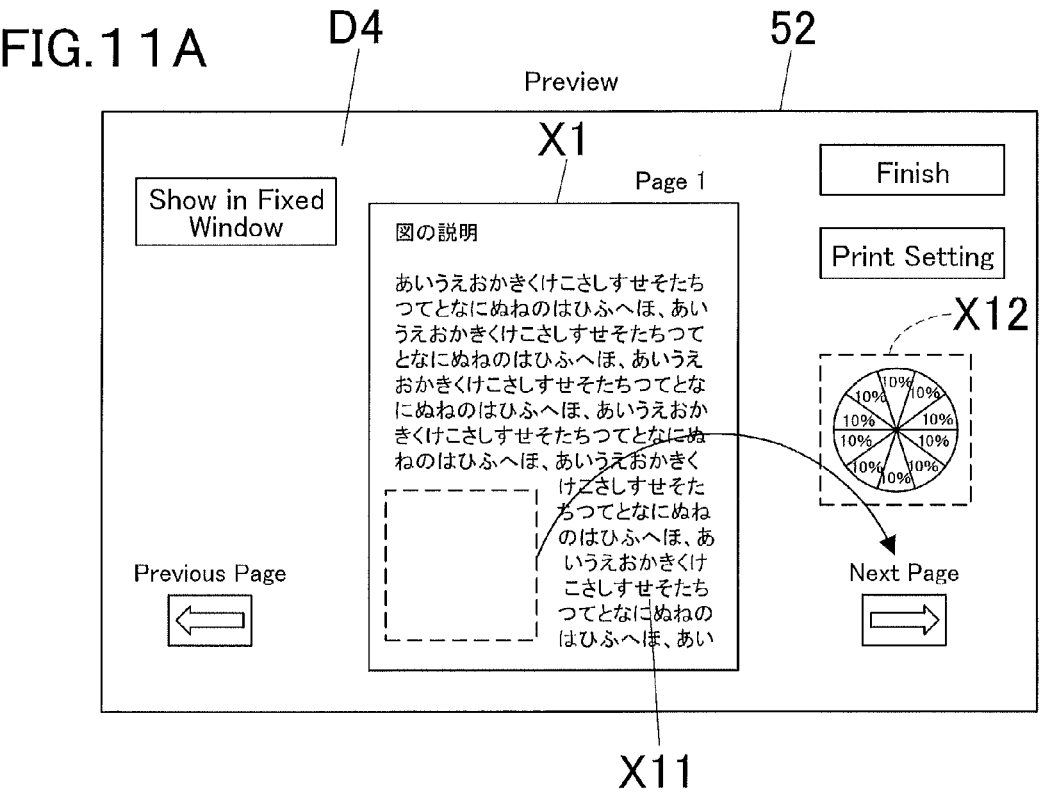
FIG. 11A illustrates a preview image of the first page of the electronic document, displayed on a display screen on the display of the operation panel along with an indication to touch an illustration section of the first page of the electronic document and drag it to the "Next Page" key.

In FIG. 11A, when a user touches the illustration section X12 of the document data X1, a first page of the document, and drags it to the "Next Page" key as indicated by a solid arrow, via a display screen D4 on the display 52 of the operation panel 50, the illustration section X12 is transferred to the document data X2, a second page of the document, and texts on the document data X2 are realigned because of the illustration section X12 having moved in from the first page of the document, and then a preview image of the document data X2 comes up in a layout adjusted thereby, as described above.

Figure 11B:
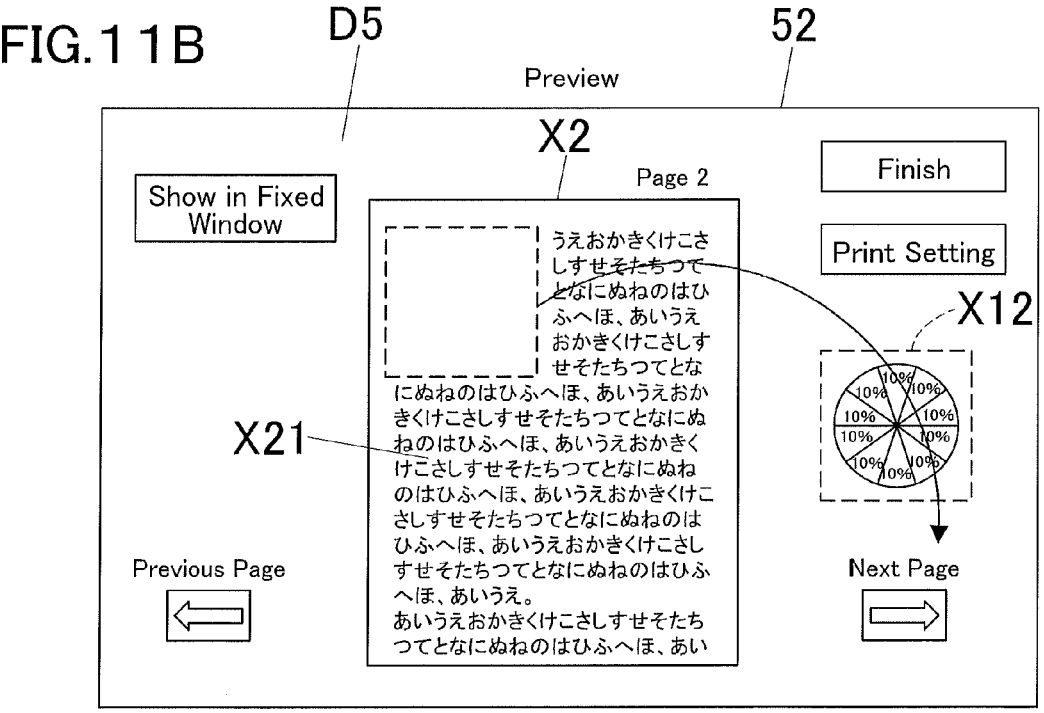
FIG. 11B illustrates a preview image of the second page of the electronic document, displayed on a display screen on the display of the operation panel along with an indication to further touch the illustration section having moved in from the first page and drag it to the "Next Page" key.

In FIG. 11B, when a user further touches the illustration section X12 of the second page of the document and drags it to the "Next Page" key, the illustration section X12 is transferred to the document data X3, a third page of the document, and texts in the text section X31 of the document data X3 are realigned so that they will not overlap with the illustration section X12 having moved in from the second page of the document, and then a preview image of the document data X3 comes up in a layout adjusted thereby.

As described above, a preview image of the destination page properly comes up along with the illustration section X12 having moved in, even after the illustration section X12 is transferred from an original page to another page more than twice, which is very useful.

Hereinafter, another embodiment of the present invention will be described.

In the previous embodiment, a preview image of a destination page is displayed along with an illustration section having moved in from an original page. In contrast, in the embodiment to be described below, a copy image of an illustration section is displayed in a fixed window regularly not depending on which page comes up to preview.

Figure 12:
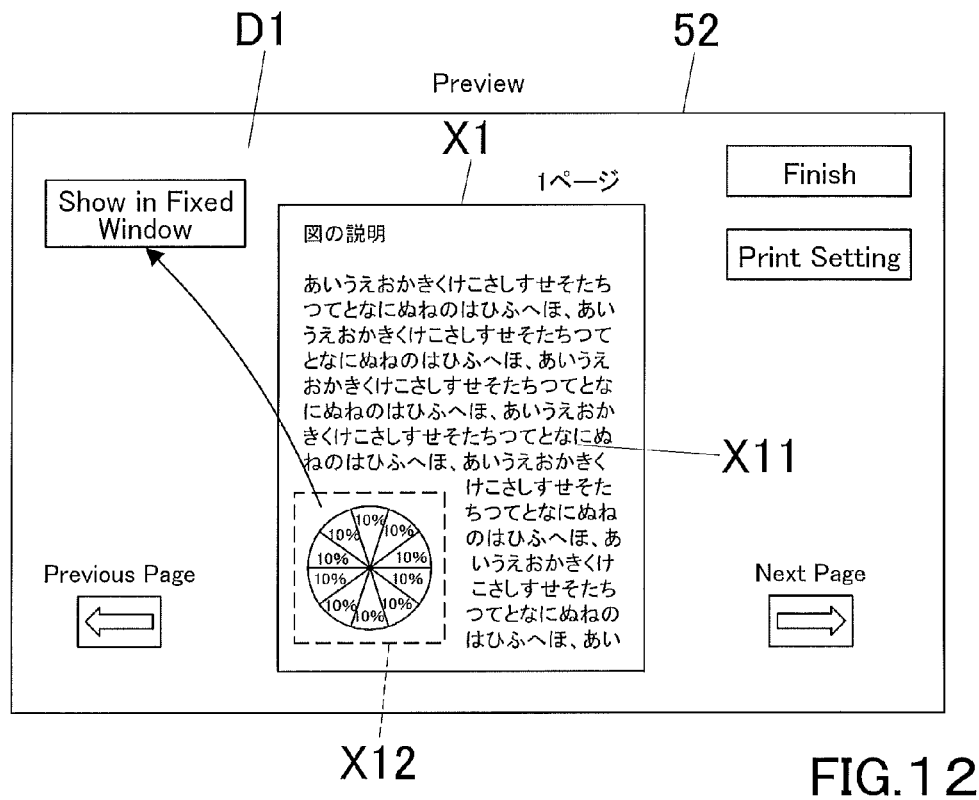
FIG. 12, which relates to another embodiment of the present invention, illustrates a preview image of the first page of the electronic document, displayed along with an indication to touch the illustration section and drag it to the "Show in Fixed Window" key.
Figure 13:
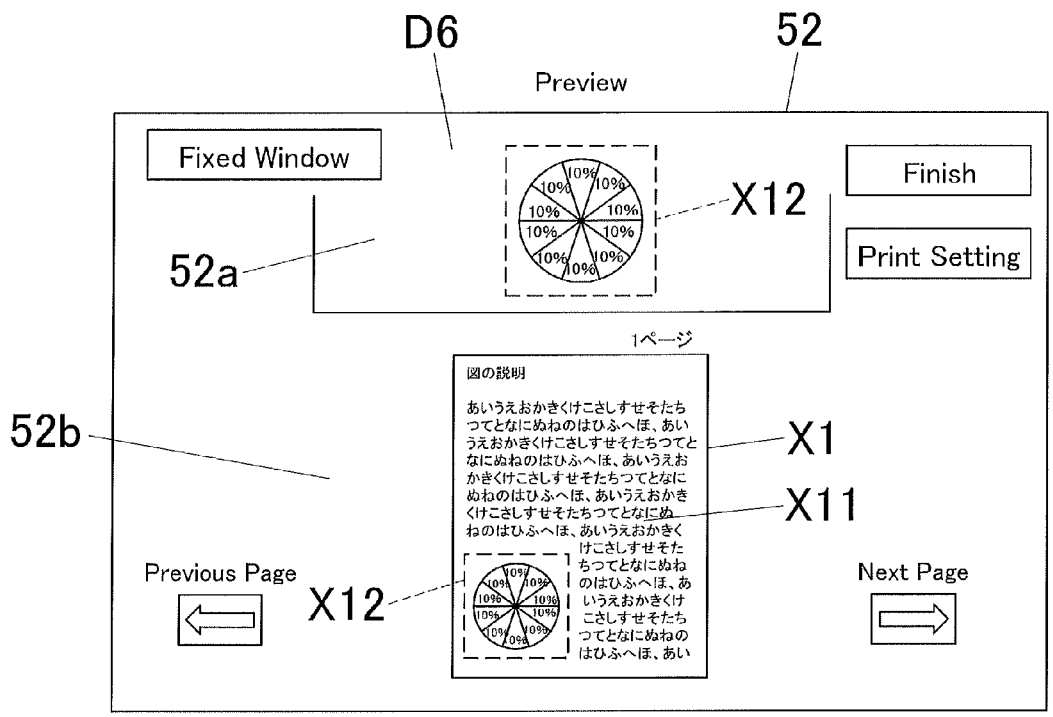
FIG. 13 illustrates a preview image of the first page of the electronic document, displayed along with a copy image of the illustration section, being in a fixed window which shows up in an upper part of the display 52.

FIG. 12 illustrates a preview image of the document data X1, the first page of the electronic data, displayed on a display screen D1. Via the display screen D1, a user touches the illustration section X12 and drags it to the "Show in Fixed Window" key. FIG. 13 illustrates a preview image of the first page of the electronic document, displayed on a display screen D6 along with a copy image of the illustration section X12, being in a dedicated upper window (fixed window) 52*a* which shows up in an upper part of the display 52. Because of the appearance of the upper window 52*a*, the size of the preview image of the document data X1, the first page of the electronic document, is reduced, and a smaller preview image of the document data X1 comes up to a dedicated lower window 52*b* which shows up in a lower part of the display 52. Obviously, the smaller preview image of the document data X1 comes up to the lower window 52*b*, along with the illustration section X12.

Subsequently, when a user presses the "Next Page" key, a smaller preview image of the document data X2, the second page of the electronic document, instead of the document data X1, comes up to the lower window 52*b*, while the copy image of the illustration section X12 still remains in the upper window 52*a*.

When a user further presses the "Next Page" key, a smaller preview image of the document data X3, the third page of the electronic document, instead of the document data X2, comes up to the lower window 52*b*, while the copy image of the illustration section X12 still yet remains in the upper window 52*a*. When a user presses the "Finish" key, preview function is terminated. With the termination of this function, the upper window 52*a* disappears.

As described above, when a user selects the illustration section X12 from one page of the document in a preview image displayed on the display 52, a copy image of the illustration section X12 comes up to the upper window 52*a*, which is a display area other than where the preview image is displayed, to be shown there regularly not depending on which page comes up to preview. Users are thus allowed to see an illustration section of a document all the time in a dedicated display area while changing the preview image from page to page; i.e., this would make it unnecessary any more to change the preview image from an original page to another page to review a photo in the illustration section thereon then return the preview image back to the original page, all manually, which has been troublesome.

Figure 14:
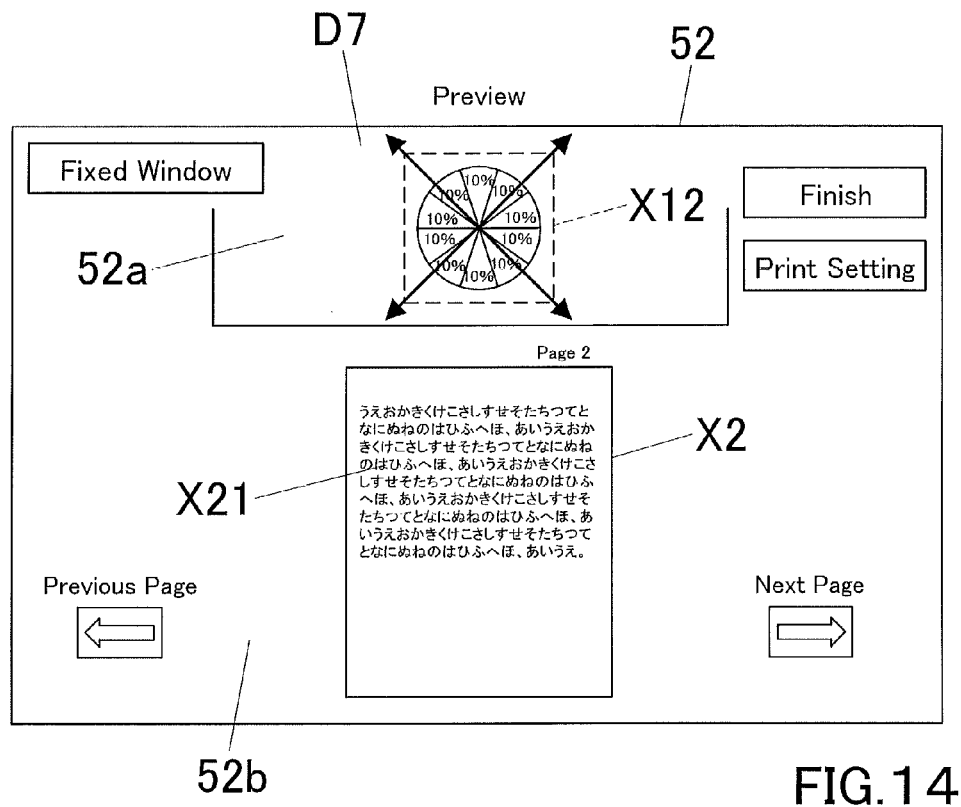
FIG. 14 illustrates a preview image coming up next to the preview image of FIG. 13 when the "Next Page" key is pressed.
Figure 15:
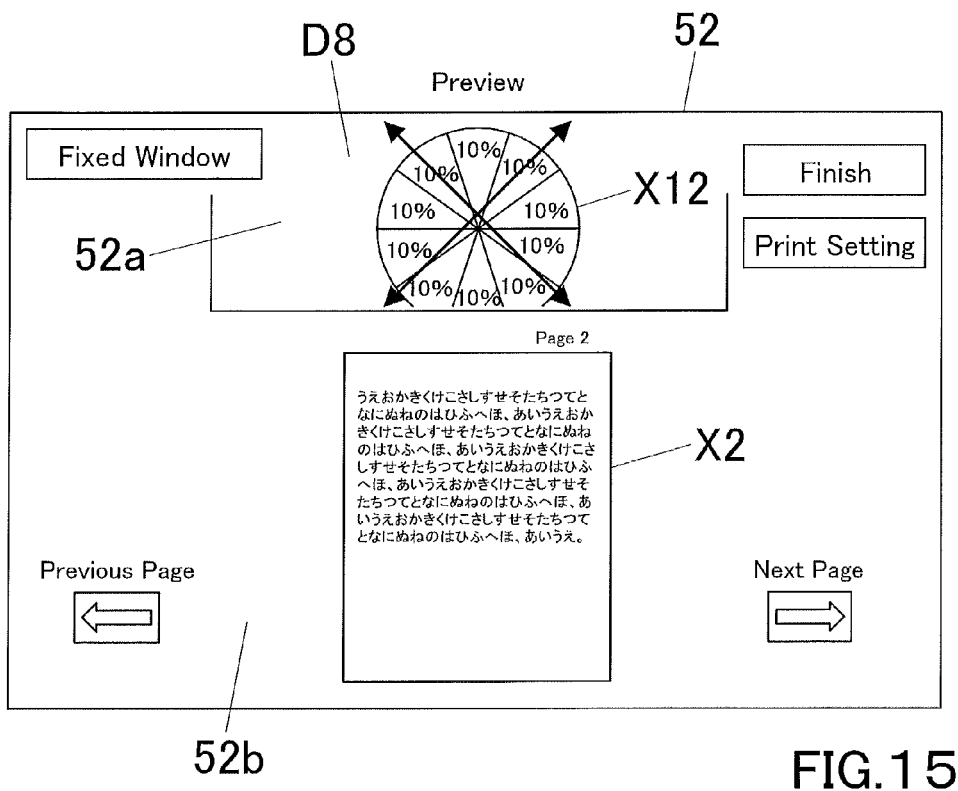
FIG. 15 illustrates a preview image of the second page of the electronic document, displayed along with an enlarged copy image of the illustration section, being in a fixed window which shows up in an upper part of the display.

FIG. 14 illustrates a display screen F7, on which a copy image of the illustration section X12 is displayed in the upper window 52a along with double-headed solid arrows to adjust the size of the copy image by touching an end of the copy image and dragging it in the direction toward or away from the center of the copy image; FIG. 15 illustrates a display screen D8, on which an enlarged copy image of the illustration section X12.

Figure 16:
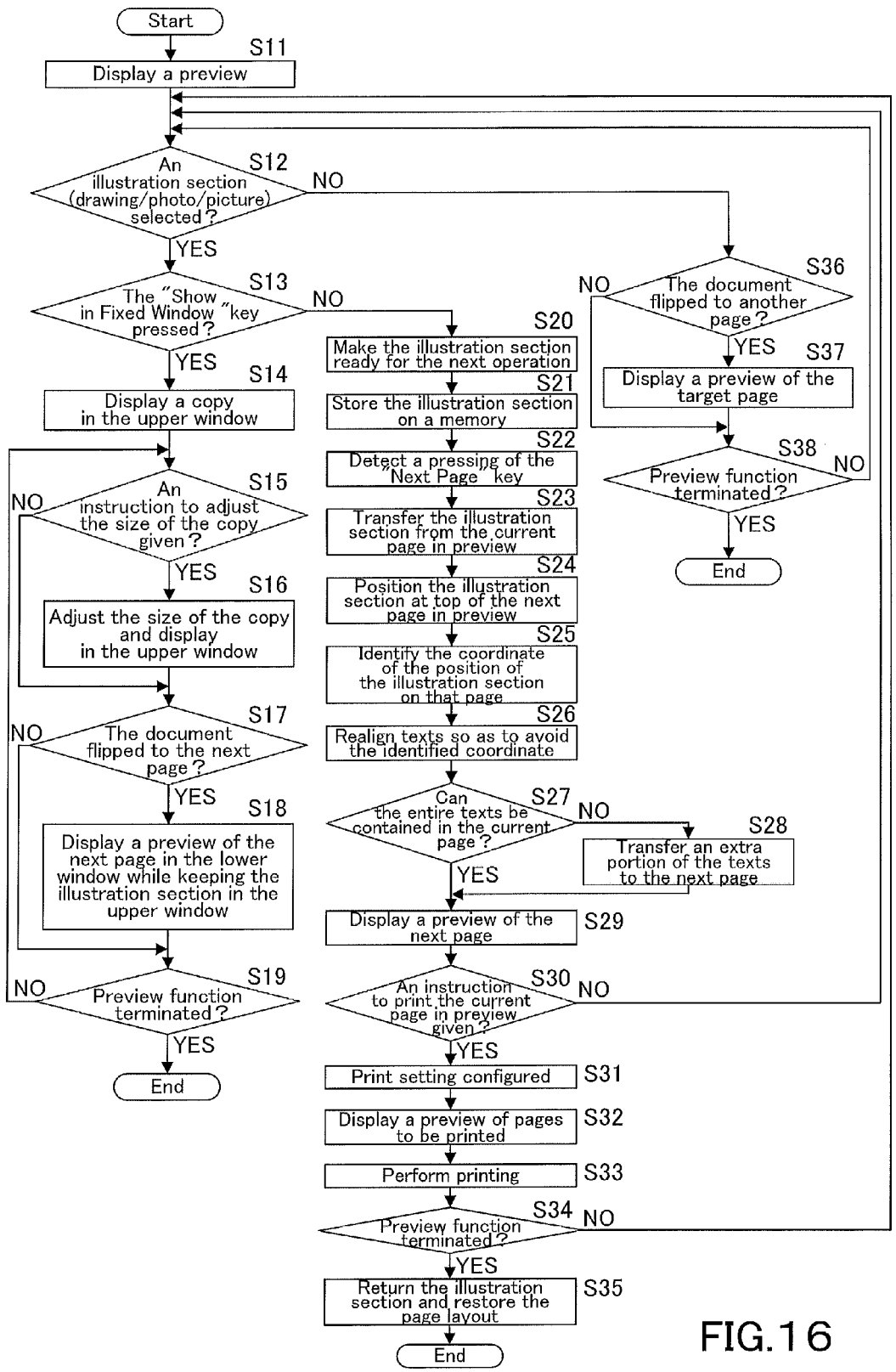
FIG. 16 is a flowchart representing an electronic document preview control operation.

FIG. 16 is a flowchart representing an electronic document preview control. This processing routine is executed by the CPU 11 of the MFP 1 according to an operation program stored on a recording medium such as the ROM 12 of the MFP 1.

When an instruction to start preview function is issued by a user, a preview image of a first page, for example, of the document data X1 is displayed in Step S11.

Then in Step S12, it is judged whether or not the illustration section X12 on the first page of the document data X1 is selected by a user. If the illustration section X12 is not selected (NO in Step S12), then by the document preview control, the processing routine proceeds to Step S36, in which it is judged whether or not the document is flipped to the next or previous page (whether or not the "Next Page" key or the "Previous Page" key is pressed). If the document is flipped to the next or previous page (YES in Step S36), the target page comes up in Step S43. Then the processing routine proceeds to Step S38. If the document is not flipped to either the next or previous page (NO in Step S36), the processing routine directly proceeds to Step S38.

In Step S38, it is judged whether or not an instruction to terminate preview function is given. If it is not given (NO in Step S38), the processing routine returns to Step S12. If an instruction to terminate preview function is issued (YES in Step S38), preview function is terminated.

If an instruction to move the illustration section X12 in Step S12 (YES in Step S12), then it is judged in Step S13 whether or not the "Show in Fixed Window" key is pressed.

If the "Show in Fixed Window" key is pressed (YES in Step S13), a copy image of the selected illustration section X12 is displayed in a fixed window, the upper window 52a. Then in Step S15, it is judged whether or not an instruction to adjust the size of the copy image of the illustration section X12 is given. If an instruction to adjust the size of the copy image is given (YES in Step S15), the size of the copy image of the illustration section X12 is adjusted accordingly and displayed in Step S16. Then the processing routine proceeds to Step S17. Meanwhile, the preview image of the first page of the document data X1 is displayed in the lower window 52b. If an instruction to adjust the size of the copy image is not given (NO in Step S15), the processing routine directly proceeds to Step S17.

In Step S17, it is judged whether or not the document is flipped to the next page (whether or not the "Next Page" key is pressed). If the document is flipped to the next page (YES in Step S17), the next page comes up to the lower window 52b while the copy image of the illustration section X12 is kept in the upper window 52a in Step S18. Then the processing routine proceeds to Step S19. If the document is not flipped to the next page (NO in Step S17), the processing routine directly proceeds to Step S19.

In Step S19, it is judged whether or not an instruction to terminate preview function is given. If it is not given (NO in Step S19), the processing routine returns to Step S15. If an instruction to terminate preview function is issued (YES in Step S19), preview function is terminated.

If the "Show in Fixed Window" key is not pressed in Step S13 (YES in Step S13), the illustration section X12 selected by a user is made ready for the next operation in Step S20 then stored on a memory in Step S21. Subsequently, the "Next Page" key is pressed in Step S22, and the illustration section X12 is transferred from the current page to the next page in Step S23.

The illustration section X12 is positioned at top of the next page in preview (a second page of the document X1 in this example) in Step S24, and the coordinate of the position of the illustration section X12 on that page is identified in Step S25. In Step S26, texts in the text section X21 are realigned so as to avoid the coordinate of the position of the illustration section X12. Then the processing routine proceeds to Step S27.

It is judged in Step S27 whether or not the realigned texts can be entirely contained in the current page. If they can be entirely contained (YES in Step S27), the processing routine proceeds to Step S29. If the realigned texts cannot be entirely contained in the current page (NO in Step S27), an extra portion of them are transferred to the next page (a third page of the document X1 in this example).

In Step S29, a preview image of the document data X2, the second page of the document, is displayed in a layout which is adjusted with the realignment of the texts. Subsequently, in Step S30, it is judged whether or not an instruction to print the current page in preview is given, i.e. whether or not the "Print Setting" key is pressed. If the print instruction is not given (NO in Step S30), the processing routine returns to Step S12. If the print instruction is given (YES in Step S30), the processing routine proceeds to Step S31.

Print setting is configured by a user in Step S31, and a preview image of the pages to be printed is displayed in Step S32. Printing is then performed by the image former 6 in Step S33.

In Step S34, it is judged whether or not an instruction to terminate preview function is given. If it is not given (NO in Step S34), the processing routine returns to Step S12. If an instruction to terminate preview function is given (YES in Step S34), the processing routine proceeds to Step S35 in which the illustration section X12 having moved in to the second or third page is returned to its original page, the first page, and the second or third page is restored to its original layout before the realignment of the texts.

The embodiments of the subject application have been described in the foregoing specification, which does not mean that the present invention shall be construed as limited to the particular forms disclosed.

For example, in these embodiments, in order to obtain the document data X1, X2, and X3 including text sections in a text data format and illustration sections in an image data format, an electronic document is obtained by the image reader 41; text sections and illustration sections are detected therefrom; and the text sections are converted to a text data format by OCR. Without performing these operations, an electronic document in a word processor format, for example, may be used as the document data X1, X2, and X3.

Alternatively, in order to obtain the document data X1, X2, and X3, an electronic document is obtained from a box of the memory 15; text sections and illustration sections are detected therefrom; and the text sections are converted to a text data format by OCR.

The present invention having been described above may be applied to the following modes.

[1] An image forming apparatus comprising:

a display which is capable of displaying a preview image of a document, the document consisting of a plurality of pages including one or more text sections in a text data format and one or more illustration sections in an image data format;

an illustration section selector which selects one of the one or more illustration sections on any of the pages in the preview image displayed on the display, according to a user operation;

a page selector which specifies one of the plurality of pages as a destination page to which the illustration section selected by the illustration section selector is to be transferred, according to a user operation;

a realignment portion which transfers the illustration section selected by the illustration section selector to the destination page selected by the page selector and realigns texts in a text section of the destination page; and a controller which allows the display to display a preview image of the destination page including the texts realigned by the realignment portion.

[2] The image forming apparatus as recited in the aforementioned mode [1], wherein when preview function is terminated, the controller returns the illustration section to its original page from the destination page and restores the destination page to its original layout before the realignment of the texts.

[3] The image forming apparatus as recited in the aforementioned mode [1], wherein the user operation that allows the page selector to select the destination page is dragging the illustration section selected by the illustration section selector, to a field indicating transfer to the destination page.

[4] The image forming apparatus as recited in the aforementioned mode [1], wherein the user operation that allows the page selector to select the destination page is entering the page number of the destination page.

[5] An image forming apparatus comprising:

a display which is capable of displaying a preview image of a document, the document consisting of a plurality of pages including one or more text sections in a text data format and one or more illustration sections in an image data format;

an illustration section selector which selects one of the one or more illustration sections on any of the pages in the preview image displayed on the display, according to a user operation;

a page changer which changes the preview image on the display from page to page; and a controller which allows the display to display the illustration section selected by the illustration section selector, in a display area other than where the preview image is displayed, not depending on which page comes up to preview because of the page changer.

[6] The image forming apparatus as recited in any one of the aforementioned modes [1] to [5], further comprising:

an image reader which reads a document to convert to an image data format that is an electronic data format;

a section detector which detects one or more text sections and one or more illustration sections from the document converted to the image data format; and a character recognition portion which recognizes texts in the text sections detected by the section detector, to convert the text sections to a text data format, wherein the document consists of the illustration sections detected by the section detector and the text sections converted to a text data format by the character recognition portion.

[7] A document preview method for an image forming apparatus, the image forming apparatus comprising a display which is capable of displaying a preview image of a document, the document consisting of a plurality of pages including one or more text sections in a text data format and one or more illustration sections in an image data format, the document preview method comprising:

selecting one of the one or more illustration sections on any of the pages in the preview image displayed on the display, according to a user operation;

specifying one of the plurality of pages as a destination page to which the selected illustrations section is to be transferred, according to a user operation;

transferring the selected illustration section to the selected destination page and realigning texts in a text section of the destination page; and allowing the display to display a preview image of the destination page including the realigned texts.

[8] The document preview method for the image forming apparatus, as recited in the aforementioned mode [7], wherein when preview function is terminated, the illustration section is returned to its original page from the destination page, and the destination page is restored to its original layout before the realignment of the texts.

[9] The document preview method for the image forming apparatus, as recited in the aforementioned mode [7], wherein the user operation that allows the page selector to select the destination page is dragging the illustration section selected by the illustration section selector, to a field indicating transfer to the destination page.

[10] The document preview method for the image forming apparatus, as recited in the aforementioned mode [7], wherein the user operation that allows the page selector to select the destination page is entering the page number of the destination page.

[11] A document preview method for an image forming apparatus, the image forming apparatus comprising a display which is capable of displaying a preview image of a document, the document consisting of a plurality of pages including one or more text sections in a text data format and one or more illustration sections in an image data format, the document preview method comprising:

selecting one of the one or more illustration sections on any of the plurality of pages in the preview image displayed on the display, according to a user operation;

changing the preview image on the display from page to page; and allowing the display to display the selected illustration section in a display area other than where the preview image is displayed, not depending on which page comes up to preview.

[12] The document preview method for the image forming apparatus as recited in any one of the aforementioned modes [7] to [11], further comprising:

reading a document to convert to an image data format that is an electronic data format;

detecting one or more text sections and one or more illustration sections from the document converted to the image data format; and recognizing texts in the detected text sections to convert the text sections to a text data format, wherein the document consists of the detected illustration sections and the text sections converted to a text data format.

According to the invention as described in the aforementioned mode [1] or [7], a preview image of a document consisting of a plurality of pages including one or more text sections in a text data format and one or more illustration sections in an image data format is displayed on a display, and users are allowed to select one of the one or more illustration sections on any of the pages of the document and a destination page to which to transfer the selected illustration section. Then, the selected illustration section is transferred to the destination page, and texts in a text section of the destination page are realigned so that they will not overlap with the illustration section having moved in, and then a preview image of the destination page is displayed in a layout adjusted thereby on the display.

As described above, an illustration section such as a drawing or photo on any page of a document is transferred to a user's desirable page, and a preview image of the destination page comes up in an adjusted layout. This would make it unnecessary any more to change the preview image from an original page to another page to review a drawing or photo in an illustration section thereon then return the preview image back to the original page, all manually, which has been troublesome.

According to the invention as described in the aforementioned mode [2] or [8], when preview function is terminated, the illustration section having moved in to the destination page is returned to its original page, and the destination page is restored to its original layout before the realignment of the texts.

According to the invention as described in the aforementioned mode [3] or [9], users are allowed to transfer the illustration section to the destination page easily only by selecting the illustration section then dragging it to a field indicating transfer to the destination page.

According to the invention as described in the aforementioned mode [4] or [10], users are allowed to transfer the illustration section to the destination page easily only by selecting the illustration section then entering the page number of the destination page.

According to the invention as described in the aforementioned mode [5] or [11], a preview image of a document consisting of a plurality of pages including one or more text sections in a text data format and one or more illustration sections in an image data format is displayed on a display, and a user selects one of the one or more illustration sections on any of the pages of the document then specifies a destination page to which to transfer the selected illustration section. Then, a copy image of the selected illustration section comes up to a display area other than where the preview image is displayed, to be shown there regularly not depending on which page comes up to preview. Users are thus allowed to see an illustration section of a document all the time in a dedicated display area while changing the preview image from page to page; i.e., this would make it unnecessary any more to change the preview image from an original page to another page to review a photo in the illustration section thereon then return the preview image back to the original page, all manually, which has been troublesome.

According to the invention as described in the aforementioned mode [6] or [12], the text sections and the illustration sections are detected from a document converted to an image data format by document reading, and the text sections are converted to a text data format by character recognition, thus a preview image of the document consisting of the detected illustration sections and the text sections converted to a text data format is displayed. Users are thus allowed to transfer one of the illustration sections to the destination page easily and see the illustration section all the time in a dedicated display area.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming apparatus comprising:
a display which is capable of displaying a preview image of a document, the document consisting of a plurality of pages including one or more text sections in a text data format and one or more illustration sections in an image data format;
an illustration section selector which selects one of the one or more illustration sections on a selected one of the pages in the preview image displayed on the display, according to a user operation;
a page selector which specifies one of the plurality of pages as a destination page to which the illustration section selected by the illustration section selector is to be transferred, according to a user operation, wherein the page selector specifies the destination page while the display is displaying the preview image of the selected page including the illustration section selected by the illustration section selector;
a realignment portion which transfers the illustration section selected by the illustration section selector to the destination page selected by the page selector and realigns texts in a text section of the destination page; and a controller which allows the display to display a preview image of the destination page including the texts realigned by the realignment portion.

2. The image forming apparatus as recited in claim 1, wherein when preview function is terminated, the controller returns the illustration section to its original page from the destination page and restores the destination page to its original layout before the realignment of the texts.

3. The image forming apparatus as recited in claim 1, wherein the user operation that allows the page selector to select the destination page is dragging the illustration section selected by the illustration section selector, to a field indicating transfer to the destination page.

4. The image forming apparatus as recited in claim 1, wherein the user operation that allows the page selector to select the destination page is entering the page number of the destination page.

5. The image forming apparatus as recited in claim 1, further comprising:

an image reader which reads a document to convert the document to an image data format that is an electronic data format;

a section detector which detects the one or more text sections and the one or more illustration sections from the document converted to the image data format; and a character recognition portion which recognizes texts in the text sections detected by the section detector, to convert the text sections to a text data format, wherein the document consists of the illustration sections detected by the section detector and the text sections converted to a text data format by the character recognition portion.

6. An image forming apparatus comprising:

a display which is capable of displaying a preview image of a document, the document consisting of a plurality of pages including one or more text sections in a text data format and one or more illustration sections in an image data format;

an illustration section selector which selects one of the one or more illustration sections on any of the pages in the preview image displayed on the display, according to a user operation;

a page changer which changes the preview image on the display from page to page;

a controller which allows the display to display the illustration section selected by the illustration section selector, in a display area other than where the preview image is displayed, not depending on which page comes up to preview because of the page changer; and wherein the page changer changes the preview image on the display while the display is displaying the illustration section selected by the illustration section selector in the display area other than where the preview image is displayed.

7. A document preview method for an image forming apparatus, the image forming apparatus comprising a display which is capable of displaying a preview image of a document, the document consisting of a plurality of pages including one or more text sections in a text data format and one or more illustration sections in an image data format, the document preview method comprising:

selecting one of the one or more illustration sections on a selected one of the pages in the preview image displayed on the display, according to a user operation;

specifying one of the plurality of pages as a destination page to which the selected illustrations section is to be transferred, according to a user operation, wherein specifying of the destination page occurs while the display is displaying the preview image of the selected page including the selected illustration section;

transferring the selected illustration section to the selected destination page and realigning texts in a text section of the destination page; and allowing the display to display a preview image of the destination page including the realigned texts.

8. The document preview method for the image forming apparatus, as recited in claim 7, wherein when preview function is terminated, the illustration section is returned to its original page from the destination page, and the destination page is restored to its original layout before the realignment of the texts.

9. The document preview method for the image forming apparatus, as recited in claim 7, wherein the user operation that allows the page selector to select the destination page is dragging the illustration section selected by the illustration section selector, to a field indicating transfer to the destination page.

10. The document preview method for the image forming apparatus, as recited in claim 7, wherein the user operation that allows the page selector to select the destination page is entering the page number of the destination page.

11. The document preview method for the image forming apparatus as recited in claim 7, further comprising:

reading a document to convert the document to an image data format that is an electronic data format;

detecting the one or more text sections and the one or more illustration sections from the document converted to the image data format; and recognizing texts in the detected text sections to convert the text sections to a text data format, wherein the document consists of the detected illustration sections and the text sections converted to a text data format.

12. A document preview method for an image forming apparatus, the image forming apparatus comprising a display which is capable of displaying a preview image of a document, the document consisting of a plurality of pages including one or more text sections in a text data format and one or more illustration sections in an image data format, the document preview method comprising:

selecting one of the one or more illustration sections on any of the plurality of pages in the preview image displayed on the display, according to a user operation;

changing the preview image on the display from page to page;

allowing the display to display the selected illustration section in a display area other than where the preview image is displayed, not depending on which page comes up to preview; and wherein changing the preview image on the display occurs while the display is displaying the selected illustration section in the display area other than where the preview image is displayed.

* * * * *